United States Patent [19]

Eiden

[11] Patent Number: 4,794,842

[45] Date of Patent: Jan. 3, 1989

[54] VALVE MEANS FOR CONNECTING AT LEAST ONE CONSUMER TO A HYDRAULIC PRESSURE LINE

[75] Inventor: Hermann Eiden, Lohr, Fed. Rep. of Germany

[73] Assignee: Mannesmann Rexroth GmbH, Lohr, Fed. Rep. of Germany

[21] Appl. No.: 82,428

[22] Filed: Aug. 6, 1987

[30] Foreign Application Priority Data

Aug. 7, 1986 [DE] Fed. Rep. of Germany ....... 3626722

[51] Int. Cl.[4] .......................................... F16B 13/043

[52] U.S. Cl. .......................................... 91/31; 91/29; 91/32; 91/461; 137/596.15; 137/596.16

[58] Field of Search ...................... 91/29, 31, 32, 461; 137/596.15, 596.16

[56] References Cited

U.S. PATENT DOCUMENTS

Re. 29,481 11/1977 Larner .......................... 137/596.15

FOREIGN PATENT DOCUMENTS 2850056 5/1980 Fed. Rep. of Germany .
3246738 3/1984 Fed. Rep. of Germany .
3239965 5/1984 Fed. Rep. of Germany .
3520745 12/1986 Fed. Rep. of Germany .
649360 5/1985 Switzerland .

*Primary Examiner*—Gerald A. Michalsky
*Attorney, Agent, or Firm*—Harness, Dickey & Pierce

[57] ABSTRACT

For connecting servohydraulic linear or rotation drives to a line with impressed pressure a valve means is provided which shuts off the pressure-carrying lines in leakage-free manner and connects the consumer line pressure-free to the tank. For a trial setting operation a fluid flow of reduced pressure and amount can be supplied to the consumers via an auxiliary means. The connection of the consumers is surge-free.

11 Claims, 2 Drawing Sheets

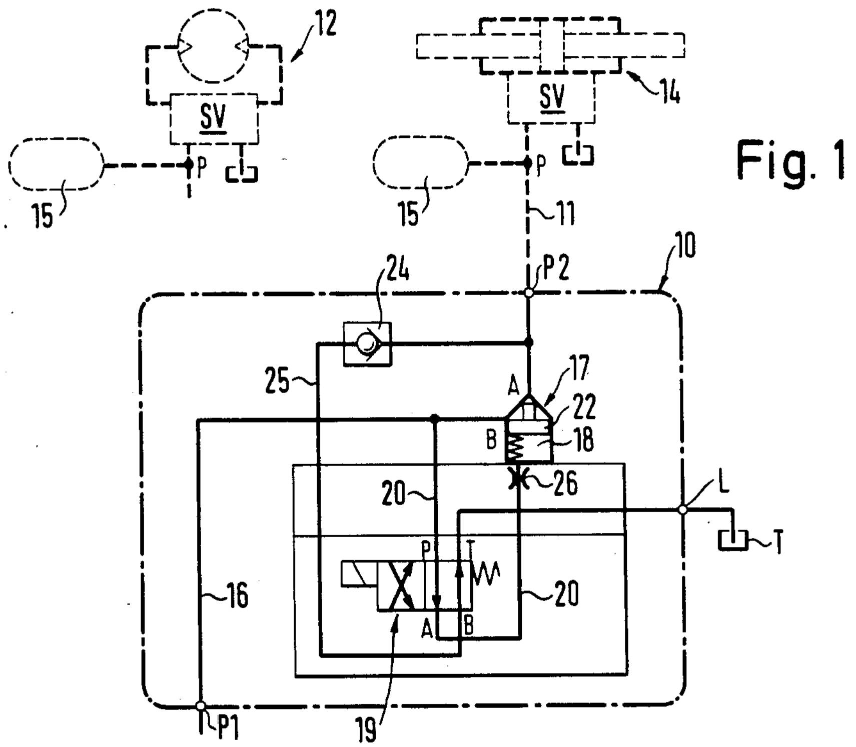
Fig. 1
Fig. 2
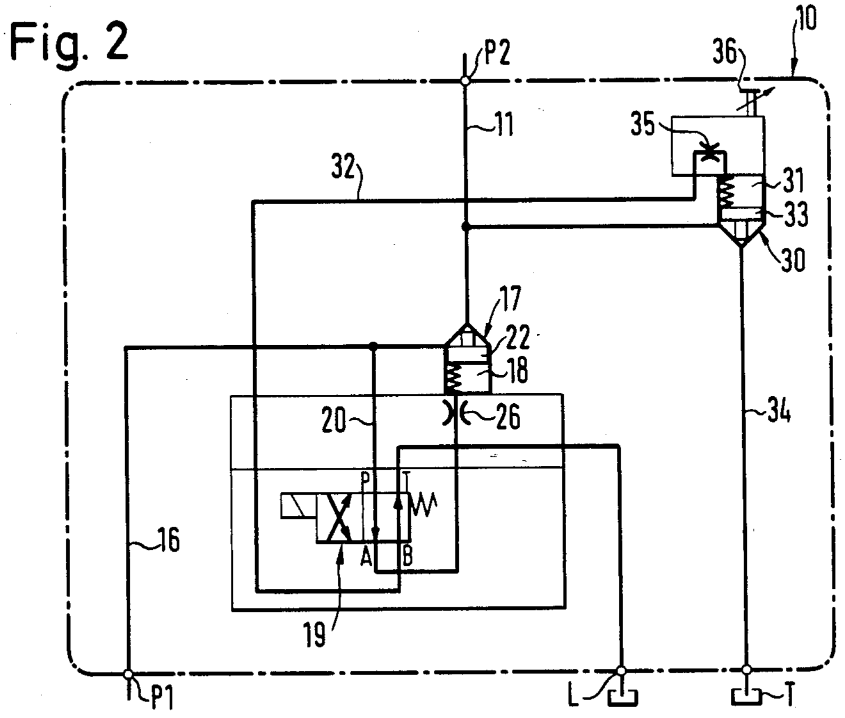

VALVE MEANS FOR CONNECTING AT LEAST ONE CONSUMER TO A HYDRAULIC PRESSURE LINE

BACKGROUND OF THE INVENTION

The invention relates to a valve means for connecting at least one consumer to a hydraulic pressure line.

For connecting servohydraulic linear or rotation drives to a line with impressed pressure, for example to a highpressure-carrying ring line system, special connection means are required with which the pressure-carrying lines can be shut off in leakage-free manner and the consumers automatically relieved of pressure in the basic position of the valves (magnets currentless).

SUMMARY OF THE INVENTION

The problem underlying the invention is to provide a valve means which fulfils the aforementioned conditions.

In addition, the consumer is to be connected surge-free or shock-free to the pressure line and in particular it is to be possible to actuate the consumers or loads in a trial with a relatively low pressure before the connection to high pressure takes place.

These additional requirements are solved according to the invention by the valve means according to claim 1 and the following claims.

The valve means according to the invention can thus be operated in three positions, i.e. a basic position in which the consumers are shut off in leakage-free manner and also relieved towards the tank and a so-called startup or setting operation in which the consumer pressure can be gradually increased up to a relatively small value at which the drives can be checked with reduced hydraulic power, and a test operation in which proceeding from the setting pressure the consumer pressure is increased up to the high pressure or near the high pressure and a surge-free connection to the pressure line takes place.

The valve means according to the invention is provided in particular for use on test benches with hydraulic drives on which workpiece tests such as measurements for bending and torsion, etc. are carried out. It is of particular advantage that the means can be operated in trial manner initially without the full hydraulic pressure at reduced hydraulic power before then switching in surge-free manner for the actual test operation to the full hydraulic power.

Further advantageous developments of the invention are characterized in the subsidiary claims.

BRIEF DESCRIPTION OF THE DRAWINGS

Examples of embodiment of the invention will be explained in detail with the aid of the drawings, wherein:

FIG. 1 shows a valve means for connection of a consumer or load to a pressure line in a first embodiment, FIG. 2 shows a valve means similar to FIG. 1 in a second embodiment and FIG. 3 shows a valve means similar to FIG. 2 with a parallel branch to a consumer-side pressure and flow control.

DETAILED DESCRIPTION OF THE PREFERRED EMBODIMENTS

Figure 3:
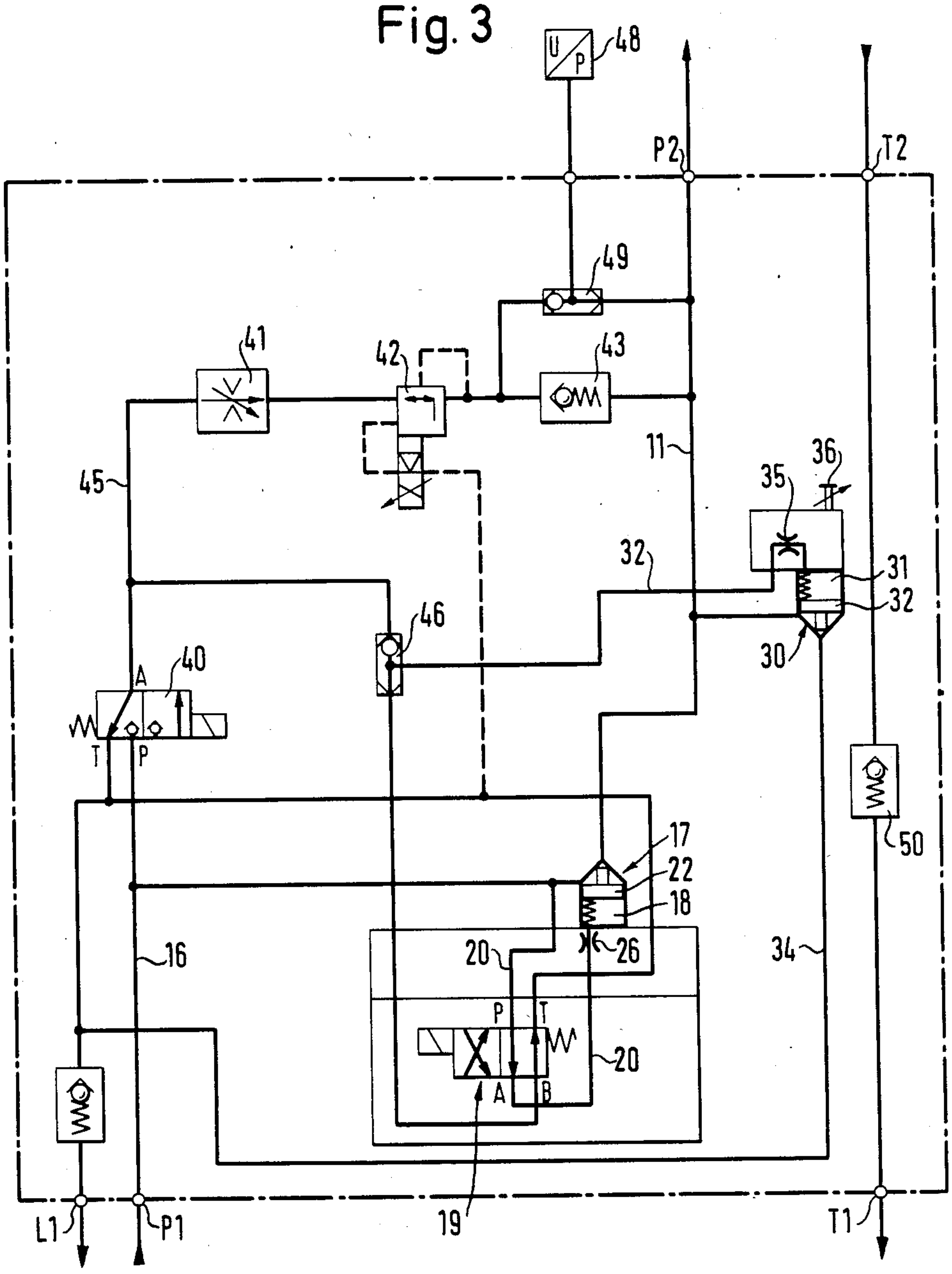

The valve means 10 in FIG. 1 comprises a connection P1 for connection to a line or conduit in which an impressed pressure obtains, e.g. to a high-pressure-carrying ring line system, and a connection P2 which via a conduit or line 11 is connected to a plurality of consumers 12, 14, e.g. rotational drives and/or servocylinders, respectively which as required can also be equipped with hydraulic reservoirs 15. The drives are for example provided on test means for workpieces, e.g. measuring bending, tensioning, torsion, etc.

Between the consumer line 11 and the pressure line 16 a twoport/two-way seat valve 17 is disposed whose spring space 18 is controlled by an electrically actuated control valve 19. A fourport/two-way slide valve is illustrated as the control valve 19. Branching off the pressure line is a control line 20 which in the switch position of the control valve 19 illustrated is connected to the spring space 18 so that the valve member 22 of the shutoff valve 17 shuts off the consumer line 11 in leakage-free manner from the pressure line 16.

Furthermore, the consumer line 11 is connected via a check valve 24 and a line 25 and via the control valve 19 to a leakage line L leading to a tank T.

Thus, in the switch position of the control valve 19 illustrated the consumer line 11 is shut off from the pressure line 16 in leakage-free manner and moreover connected pressure-free to the tank. This makes it possible to carry out adjustments by hand on the drives 12, 14 free of pressure, change connections and execute any other necessary work.

For connecting the drives to the pressure line 16 the control valve 19 is switched over, the spring space 18 is thus connected via the connection A to the connection T and thus to the leakage line L whilst the control line 20 is connected to the line 25 in which the check valve 24 is disposed. For damping the switchover a throttle 26 is provided in the control line.

FIG. 2 illustrates a valve means 10 in which identical components to FIG. 1 are provided with the same reference numerals. Whereas in FIG. 1 on closing the shutoff valve 17 the fluid volume included in any drives 12, 14, any compression volume of the drives and the filling volume of the consumer-side pressure accumulators or reservoirs 15 flows via the control valve 19 into the leakage line L via check valve 24. In FIG. 2 a separate relief valve 30 is provided which is also made as twoport/two-way seat valve to enable leakage-free shutoff. Via the relief valve 30 larger filling volumes can be led off to the tank T than via the relatively small control valve 19. In FIG. 2 the relief valve 30 is also driven by the control valve 19. In the switch position of the control valve 19 illustrated once again the spring space 18 of the shutoff valve 17 is connected via the control line 20 to the pressure line 16 whilst the spring space 31 of the relief valve is connected via a line 32 and the control valve 19 to the leakage line L. The valve member 33 may thus open and the consumer line 11 will be connected to the relief line 34 leading to the tank T. A relief valve 30 is provided with a stroke limiter 36 that limits the opening stroke of the valve member 33 and thus the relief duration can be varied.

If the control valve 19 is switched over the spring space 18 of the shutoff valve 17 is connected via the connections A, T to the leakage line L and the spring space 31 of the relief valve 30 via the connections B, P to the control line 20 and thus put under pressure so that the relief valve 30 closes and the shutoff valve 17 opens. The switch-over of the relief valve 30 is also dampened via a throttle 35.

FIG. 3 shows an extended valve means in which the shut-off valve 17 and the relief valve 30 for the consumer line 11 are again provided in a manner similar to FIG. 2 with the same reference numerals and actuated in the manner already explained to connect the consumer line 11 to the pressure line 16 or to shut off the consumer line 11 leakage-free from the pressure line and connected to a tank or the leakage line.

In FIG. 3 parallel to the shutoff valve 17 and the relief valve 30 an auxiliary means is provided which consists of a second shutoff valve 40, a flow-control valve 41 and a pressure-regulating valve 42 which are arranged in this order and open via a check valve 43 into the consumer line 11. The shutoff valve 40 is an electrically actuated threeport/two-way seat valve which again has a leakage-free shutoff. The auxiliary means makes it possible to set a pressure in the consumer line 11 which can be adjusted to a smaller value than the pressure in the pressure line 16 and to limit the admission amount. This is desirable if the drives supplied by the consumer line 11 are to be actuated in a trial operation or setting operation by operating with only small pressures to avoid excessive forces. For example, in the setting operation the pressure will be adjusted so that for example the control fluid requirement of servovalves and the fluid requirement of hydrostatic bearings is covered. Apart from this the drives can be slowly moved.

In FIG. 3 three switch positions are thus possible, i.e. a basic position, the setting or trial position and the actual test operation.

In the basic position the magnets of all the electrically actuated valves are currentless. In the basic position the shutoff valves 17 and 40 are closed, i.e. they shut off the consumer line 11 from the pressure line 16 in leakage-free manner. Furthermore, in the basic position the consumer line 11 is connected via the relief valve 30 to the leakage line 34 and the leakage connection L1.

To supply a relatively low pressure to the consumer line 11 for the setting operation, i.e. permit a trial slow moving of individual drives, proceeding from the basic position shown a start signal is given with which the shutoff valve 40 is opened, the branch line 45 thereby being put under pressure. A shuttle valve 46 switches over and the pressure is propagated via the line 32 to the relief valve 30 which is thereby closed.

The pressure-regulating valve 42 now increases the pressure in the consumer line 11 from a basic position via a time ramp up to a predetermined setting pressure which can for example be 70 bar. Via the time ramp the pressure is continuously increased. The consumer-side pressure is measured in the pressure pickup 48 which is connected via a shuttle valve 49 to the consumer line 11 and to the output-side connection of the pressure-regulating valve 42. Once the predetermined setting pressure adjustable at a potentiometer, not illustrated, for driving the pressure-regulating valve 42 has been reached said setting pressure is now maintained on the consumer side.

The fluid flow flowing to the consumers in the setting operation mode can be preselected at the flow-control valve 41 up to the maximum setting value thereof. Thus, on the consumer side a relatively low pressure and a limited fluid admission may be set so that the drives and the measured value pickups of the workpieces to be tested and the associated electronics can be checked with reduced hydraulic power without any risk of damage due to excessive hydraulic forces.

Once this setting operation has been concluded the switching to the actual test mode is effected. For this purpose after a corresponding signal application the current desired value at the pressure-regulating valve 42 is increased so that the pressure in the consumer line 11 is raised via a time ramp. The predetermined desired value for the pressure is the system pressure at which the shutoff valve 17 is to open. As a rule the system pressure is further achieved by the admission via the auxiliary means, i.e. the flow regulator 41 and the pressure-regulating valve 42. In certain cases this is not possible so that the switchover pressure can be set for example to 90% of the pressure in the line 16. Once this pressure value is reached in the consumer line 11 the control valve 19 is actuated so that in the manner already described the spring space 18 of the shutoff valve 17 is relieved of pressure so that the shutoff valve 17 opens. Since via the auxiliary means the fluid volume in the consumer line has already been compressed to the system pressure on opening of the shutoff valve 17, a hard pressure surge is avoided. If in the consumer line 11 the system pressure is reached, e.g. 280 bar, which is measured by the pressure pickup 48, the desired value for the pressure-regulating valve 42 drops. The shutoff valve 40 then switches to the basic position, i.e. shuts the line 45 in leakage-free manner off from the pressure line 16. The relief valve 30 is now held hydraulically in the shutoff position via the shuttle valve 46 and the control valve 19 from the control line 20.

To terminate the test mode by a suitable signal the consumer line 11 is separated from the pressure line 16. For this purpose the magnet of the control valve 19 becomes currentless and the control valve returns to the position illustrated in which in the manner already described the consumer line is shut off in leakage-free manner. At the same time the spring space of the relief valve 30 is relieved of pressure and the relief valve is opened by the pressure still obtaining in the consumer line 11. The included compression volume and the filling volume of pressure accumulators or reservoirs disposed on the consumer side flows off to the leakage line 34. Via the stroke limitation 36 of the relief valve 30 the opening stroke of the valve member 32 and thus the relief duration can be varied.

If the fluid admission to the consumer line 11 necessary for the setting mode must be increased instead of the three/two-way seat valve 40 a two/two-way seat valve may be used which is available for greater flow cross-sections. This valve is then activated likewise by an electrically actuated control valve which has the same construction as the control valve 19 and which is provided in corresponding manner for switching over the two/two-way seat valve.

The discharge-side connection of the loads is via a connection T2 to the valve means which is connected via a check valve 49 to the connection T1 leading to the tank. Thus, the entire valve means including the connection system and the connections for the admission and return lines of the consumers can be arranged in a block in compact plate construction.

I claim:

1. Valve means for connecting at least one consumer to a hydraulic pressure line or a tank line, characterized by a first pressure operated shutoff valve for shutting off in leakage-free manner said consumer from said pressure line, a pressure-regulating valve and a directional seat valve in series with each other and operating as second shutoff valve parallel to said first shutoff valve and a control valve having two switch positions, in a first switch position of which a control line from the pressure lines is connected to operate said first shutoff valve for shutting off said first shutoff valve and the consumer is connected to the tank and in a second switch position of which the control line is shut off and the said first shutoff valve is connected to the tank for opening said first shutoff valve, means for operating said second shutoff valve, means for operating said shutoff valves in such a manner that only one shutoff valve can be switched to the on position at any time, and a pressure operated directional seat valve provided as relief valve, said pressure operated directional seat valve in the first switch position of said control valve being connected to the tank and in the second switch position being connected to said control line.

2. Valve means according to claim 1 characterized in that the control valve is a four port/two-way slide valve and the first shutoff valve is a two port/two-way seat valve.

3. Valve means according to claim 1, characterized in that the pressure-regulating valve increases the consumer pressure from a basic position via a time ramp to a predetermined setting pressure.

4. Valve means according to claim 3 , characterized in that after reaching the setting pressure said pressure is regulated to a constant value.

5. Valve means according to claim 3 characterized in that the pressure-regulating valve proceeding from the setting pressure increases the consumer pressure via a time ramp to a predetermined system pressure.

6. Valve means according to claim 1 characterized in that the relief valve is switched hydraulically to the shutoff position before activation of the pressure-regulating valve.

7. Valve means according to claim 1 characterized in that the relief valve is held hydraulically in the closure position via a shuttle valve 8. Valve means according to claim 1 characterized in that the second shutoff valve is an electrically actuated three port/two-way seat valve.

9. Valve means according to claim 1 characterized in that the second shutoff valve is a hydraulically actuated two port/two-way seat valve whose hydraulic actuator can be connected by a control valve to the control line or the tank.

10. Valve means according to claim 1 characterized in that between the second shutoff valve and the pressure-regulating valve a flow-regulating valve is provided.

11. Valve means according to claim 1 characterized in that the consumer is protected with respect to the pressure-regulating valve by a check valve.

* * * * *